United States Patent
Jensen et al.

(12) 
(10) Patent No.: US 6,208,112 B1
(45) Date of Patent: Mar. 27, 2001

(54) METHOD FOR CONTROLLING A VOLTAGE/FREQUENCY CONVERTER CONTROLLED SINGLE-PHASE OR POLYPHASE ELECTRIC MOTOR

(75) Inventors: Niels Due Jensen, Bjerringbro; Pierre Vadstrup, Mundelstrup, both of (DK)

(73) Assignee: Grundfos A/S, Bjerringbro (DK)

( * ) Notice: Subject to any disclaimer, the term of this patent is extended or adjusted under 35 U.S.C. 154(b) by 0 days.

(21) Appl. No.: 09/471,671

(22) Filed: Dec. 24, 1999

(30) Foreign Application Priority Data

Dec. 28, 1998 (DE) ............................................... 198 60 446

(51) Int. Cl.$^7$ ....................................................... H02P 5/28
(52) U.S. Cl. ........................... 318/805; 318/254; 318/439; 318/138
(58) Field of Search ..................................... 318/805, 254, 318/439, 138

(56) References Cited

U.S. PATENT DOCUMENTS 5,378,976  1/1995  Inaji et al. .
5,929,622 * 7/1999 Kardash ................................ 323/315

FOREIGN PATENT DOCUMENTS 0 7901 463
    A1    4/1997   (EP) .
8-235015    9/1996   (JP) .

* cited by examiner

*Primary Examiner*—Karen Masih
(74) *Attorney, Agent, or Firm*—Jacox, Meckstroth & Jenkins

(57) ABSTRACT

The method for controlling a voltage/frequency converter controlled single-phase or polyphase electric motor evaluates the phase shifting between the EMF and BEMF by way of the deviation between the zero crossing of the phase current and the voltage produced by the intrinsic induction and readjusts the frequency of the converter accordingly. The measurement of the intrinsic induction is effected in the zero crossing of the current courses of the associated phase, wherein during the measurement the phase is separated from the supply network.

16 Claims, 4 Drawing Sheets

Figure 1:
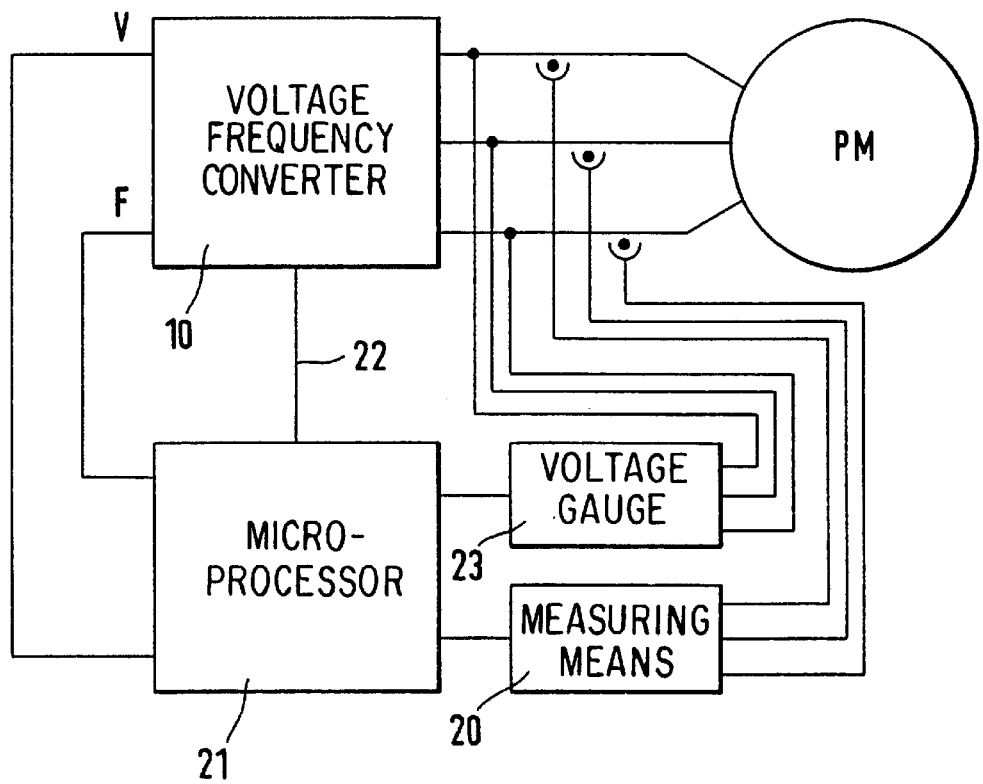

METHOD FOR CONTROLLING A VOLTAGE/FREQUENCY CONVERTER CONTROLLED SINGLE-PHASE OR POLYPHASE ELECTRIC MOTOR

BACKGROUND OF THE INVENTION

The invention relates to a method as well as to a device for controlling a voltage/frequency converter controlled single or polyphase electric motor.

DESCRIPTION OF RELATED ART

Such a method may for example be applied to single-phase or polyphase permanent magnet motors but also to asynchronous motors. Polyphase permanent magnet motors are for example formed three-phase and comprise on the rotor side permanent magnets and on the stator side windings. In order to set the rotor into rotation in the for example three-phase stator winding a rotating rotary field must be produced which for example may be effected with the help of an inverse rectifier. With this one differentiates between block commutation and sine commutation.

With block commutation a constant intermediate circuit voltage in dependence on the rotor position with a changing polarity is connected to the respective phase windings. By way of this into the phase windings block-shaped currents are impressed against the trapezoid-shaped motor induction voltage. The motor rotational speed is determined by the exit voltage of the converter whose mean value may be changed by way of pulse width modulation.

With a sine-commutated motor against the sinusoidal motor induction voltage there is impressed a sinusoidal current into the phase windings. In contrast to block commutation the windings are continuously flown through by current. The pulse-width modulated inverse rectifier varies the width of the individual pulses such that as a base oscillation there arises a sinusoidal voltage.

Independently of the type of the commutation one constantly strives to bring the rotating rotary field in the stator to correspond to the magnetic field of the rotor, since then the motor then runs particularly smoothly and with a uniform torque. This may for example be effected in that the phase shifting between the rotary field produced by the voltage impingement and the intrinsic induction of the motor is evaluated and the motor drive-control is correspondingly corrected. This error position between the rotary field rotating in the stator and the rotary field produced in the rotor by permanent magnets or the induction produced by way of this may be evaluated sensorically, for example via Hall sensors attached in the motor near to the stator. Such an acquisition via rotor position sensors is constructionally very expensive and furthermore yet requires expensive evaluation electronics, which however with sine-commutated motors at present may not be avoided, since the voltage induced within the motor phase windings on account of the continuous sinusoidal voltage impingement is practically no longer measurable.

Although with block-commutated motors the intrinsic induction may also be acquired in that this may be measured in the level current-free phase, these block-commutated motors however have the disadvantage that these on account of their hard drive-controlling as a rule have a considerably worse running manner than the sine-commutated motors, in particular a more erratic running and higher running noise. The later is particularly disadvantageous with the application in combination with heating circulatory pumps since the acoustic oscillations of the drive may propagate almost undampened via the heating tube system.

It is to be understood that with the application of such a method for controlling an asynchronous motor the phase position of the intrinsic induction is not brought to correspond with that of the phase winding current but in a predetermined ratio. Otherwise a control with asynchronous motors is usually not effected. It is however known for optimizing the efficiency with a constant rotational speed to minimize the motor current in that the voltage and frequency are changed within predetermined limits until the power consumption of the motor is minimized.

SUMMARY OF THE INVENTION

It is the object of the present invention therefore to provide a smoother-running single or polyphase electric motor, in particular a permanent magnet motor in which the running quietness is increased by control of the phase deviation between the electrical and the magnetic field or of a predetermined ratio of these. With this the design cost and the measurement cost is to be as small as possible.

The part of the object with regard to method is achieved by the features specified in claim 1. Claim 11 defines the construction of the invention with regard to the device.

The invention thus envisages the measurement of the intrinsic induction of the motor, in particular the voltage induced in at least one motor phase winding, and bringing it to correspond with the winding current of the same motor phase winding or in a predetermined ratio with this, and specifically by way of the fact that according to phase position by way of the control the frequency and/or voltage supplied to the motor in the next control interval is reduced or increased until the phase positions of the intrinsic induction and of the associated phase winding current correspond or essentially correspond or have the predetermined ratio. Then and only then is there to be expected a particularly smooth and low-noise running of the motor, since then the rotating rotary field of the stator winding with respect to the rotating magnetic field of the rotor are at the desired and directed relationship. Usefully with this the control is effected such that the frequency increase or frequency reduction and/or the voltage increase or voltage reduction is fixed in dependence on the measured phase difference for the next control interval, for example proportionally or according to other suitable control curves.

The method according to the invention may for example be applied to a permanent magnet motor as a commutation method. It may also be applied independently thus additionally with the application on another commutation method in order to optimize the running of the motor. With an asynchronous motor the method according to the invention may preferably be applied for optimizing the power and efficiency. The particular advantage of this method in comparison to the usual, previously described method for optimizing the efficiency lies in the fact that with the method according to the invention continuously one always intervenes in a correcting manner, whereas with the known method quasi by way of inputting various settings a good operating point is empirically evaluated.

The result of the control is more exact the more is measured and the more is readjusted. For this reason it is advantageous to evaluate the residual induction (back electromotive force) by way of suitable voltage or current measurement in each motor phase winding in order thus to be able to control also in each motor phase winding.

In order to be able to measure the intrinsic induction, thus the voltage induced in the motor in a simple manner and without complicated electronic evaluation means, it is useful to separate the motor phase windings in which the intrinsic induction is to be measured, from the supply network, so that the measurement is not disturbed by the applied supply voltage. A separation from the network may where appropriate be done away with when one measures only during a comparatively short time interval in which the supply voltage is zero.

It is particularly useful when the measurement of the induced voltage is triggered by the detection of the zero crossing of the motor current in the corresponding motor phase winding, which means that the respective motor phase winding directly after detection of the zero crossing of the associated phase winding current is switched off, i.e. is separated from the supply network and then in a comparatively short time interval the intrinsic induction of this motor phase winding is measured, whereupon this motor phase winding in turn is connected to the supply network. It has been shown that for the measurement of the intrinsic induction only a fraction of a period is necessary so that the separation from the supply network in practice cannot be noticed. The detection of the zero crossing has particular advantages with regard to measuring technology as well as circuit technology, since by way of this on the one hand the phase position of the rotating rotary field is acquired and on the other hand the switching off from the supply network may be effected in a particularly gentle manner since on account of the current which at this moment is not present in the motor phase winding concerned, one may connect free of power. For this the electronic switches which are in any case present in the converter may otherwise beused.

The intrinsic induction may either be evaluated directly by voltage measurement, it may however also be determined by way of the phase winding current when this with a short-circuited motor phase winding is measured. This has the advantage that only one measuring means is required with which then there may be measured the zero crossing of the phase winding current as well as also the phase winding current which sets in with a short-circuited motor phase winding on account of the intrinsic induction. If the measuring interval is selected sufficiently short, then with this a separation of the motor phase winding from the supply network does not even need to be effected again, since the supply voltage in this region is zero anyway and thus the supply network is not loaded by short-circuit.

A particularly exact control is then possible when the intrinsic induction after two subsequent zero crossings of the phase winding current of the same motor phase winding is measured, since then at a very early point in time the effect of the frequency change carried out for the purpose of the control may be recognized and where appropriate be re-controlled.

The control is effected in a manner such that firstly it is once determined whether with the just detected zero crossing the phase winding current is in the process of rising or falling. This information on the converter side is available without further ado, but may be acquired with measuring technology without great expense. Then the phase position of the induced voltage or of the induced current with a short-circuited motor phase winding, thus of the measuring signal is evaluated with respect to the zero crossing of the phase winding current, wherein with a leading phase winding current there results a positive polarity and with a lagging phase winding current there results a negative polarity of the phase position. Under the assumption of an increasing phase winding current then with a positive measuring signal the frequency supplied to the motor in the next control interval is increased and with a negative measuring signal in the next control interval is decreased. If the phase winding current falls, there is effected a control correction in exactly the reverse manner. Instead of the previously described frequency change also or additionally the voltage prevailing at the motor phase winding may be changed, wherein a voltage reduction corresponds to a frequency increase and vice-versa.

The method according to the invention, with a low cost with respect to measurement technology and exploiting components which in any case are largely present on the converter side, permits a sine-commutation with phase control which ensures a great running smoothness of the motor and low noise emission. However also other commutation methods or motor operating-controls may be improved therewith.

The construction of the invention with regard to the device is characterized in that to the voltage converter/ frequency converter there is allocated a control means which as a correcting variable controls the output frequency and/or the voltage of the converter. The control variable is with this the phase shifting for whose acquisition there is provided a measuring means. The application of only one measuring means is then possible when the intrinsic induction not as usual is evaluated by way of the induced voltage but by way of the induced current with the winding short-circuited. Then with one measuring means as previously described the zero crossing may be detected and also the phase winding current with a short-circuited winding and thus the intrinsic induction may be acquired. If on the other hand the intrinsic induction is evaluated by voltage measurement then two measurement means are required. The one measurement is provided for acquiring the intrinsic induction (voltage) in at least one motor phase winding and may be formed by a simple voltage gauge. The other measuring means is provided for acquiring the current in the corresponding motor phase winding. The exit signals of these measuring means are supplied to an evaluation means which evaluates the phase position of the intrinsic induction with the same motor phase winding of the phase winding current and corresponding to the evaluated value outputs an evaluation signal to the control means, by which means the control means carries out a suitable drive-control of the converter, and specifically such that with a leading of the intrinsic induction to the converter there is supplied a control signal which effects a frequency increase/voltage reduction in the next control interval until the phase position of the intrinsic induction and of the phase winding current correspond or (with an asynchronous motor) these have a predetermined ratio. If the intrinsic induction lags the phase winding current the control signal led to the converter is such that a frequency reduction/ voltage increase is effected in the next control interval, and specifically again for so long until the phase positions of the intrinsic induction and of the phase winding current correspond or at least lie in previously fixed limits. It is clear that the construction with regard to the device is comparatively simple since the control means only needs to comprise a measuring means in the form of a current gauge or two measuring means in the form of a voltage gauge and in the form of a current gauge. With this the required measuring means may be designed in a simplified manner, since a complete acquisition of the current course in the respective motor phase winding is not required but only of the point in time of the zero crossing. Also the voltage gauge acquiring the intrinsic induction or the current gauge with the use of only one measuring means may be formed simplified since only the acquisition of the direction of the voltage or of the current, thus of the polarity is necessary and not their magnitude. The evaluation means may be implemented with regard to software for example by way of the microprocessor usually present in modern control means. The whole device may be integrated into the control of a compact frequency converter arranged on the motor of an operating machine or may be a component part of the remaining control.

Advantageously the first measuring means is provided not only for the measurement of the intrinsic induction of a motor phase winding but also for the measurement of the intrinsic induction of all motor phase windings. Since the measurement of the intrinsic induction need be effected not over the whole time but only a comparatively small time window, there is sufficient a voltage gauge which by way of quick electronic switches when required is connected to the motor phase winding to be measured in each case. It may however also be provided for a separate measuring means for each motor phase winding.

Usefully the second measuring means comprises a zero crossing detector or is formed as such. The detection of the zero crossing of the winding current of the phase just to be measured indicates the point in time which is particularly advantageous for the measurement of the intrinsic induction. As already previously explained an acquisition of the intrinsic induction thus a measurement of the voltage induced in the respective motor phase winding may only be effected without considerable cost with respect to measurement technology and evaluation technology when the corresponding motor phase winding is switched off or is free of voltage. This switching off for measuring purposes is usually effected immediately on detection of the zero crossing, since one may then connect free of load and otherwise the electrical power supplied to the motor at least when the measuring interval is selected suitably short, is practically not reduced by this short-lived network separation.

The evaluation means evaluates the phase difference between the phase winding current and the intrinsic induction of the same phase and emits for example a proportional evaluation signal whose polarity with a leading phase of the intrinsic induction is for example positive and with a lagging phase of the intrinsic induction is negative, wherein the signal size of the phase difference corresponds to the magnitude. The control means converts this evaluation signal into a suitable correcting variable for the converter in a manner such that the frequency and/or voltage applied to the motor is increased, reduced or held constant in dependence on the acquired phase difference between the intrinsic induction and the phase winding current.

Within the context of the invention a sinusoidal commutation is not only to be understood as purely mathematical sinusoidal current courses in the individual windings, but also truncated or other modified shape courses. With a three-phase permanent magnet motor the number of motor windings usually deviates from the number of phases. Also the motor windings amongst one another are connected to one another such that there results a number of individually drive-controllable windings which corresponds to the number of motor phases. In order to emphasize this the term phase winding or motor phase winding is introduced. This is to be understood as all windings of the same motor phase.

Figure 2:
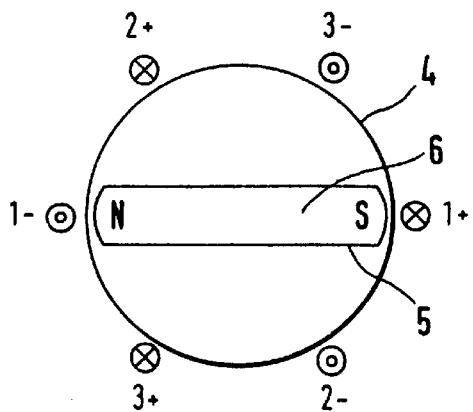
Figure 3:
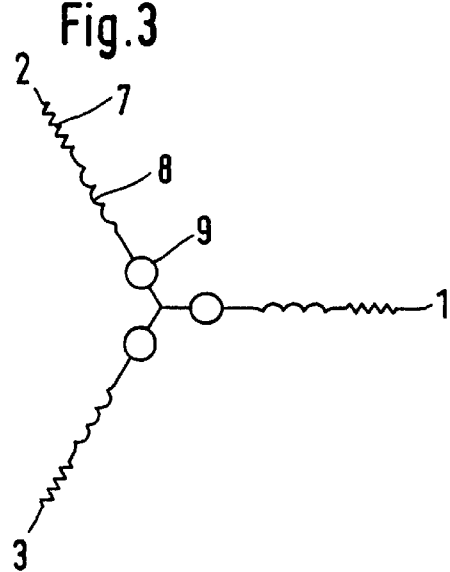
Figure 4:
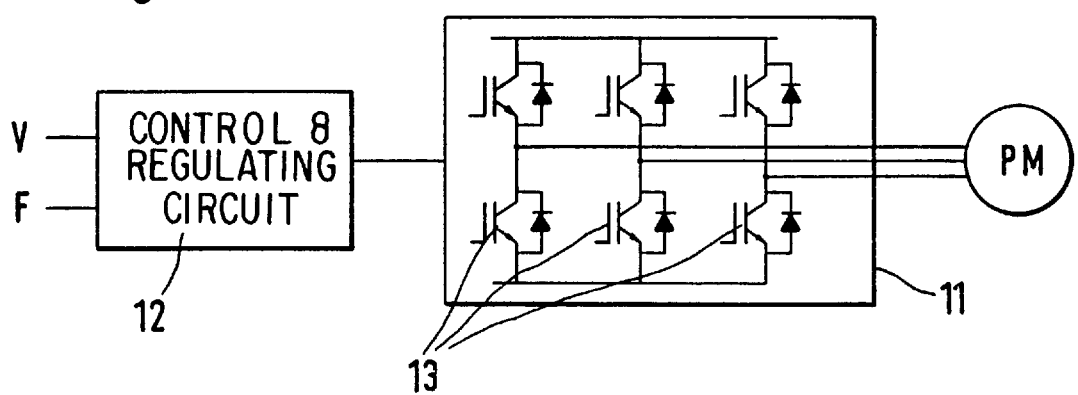
Figure 5:
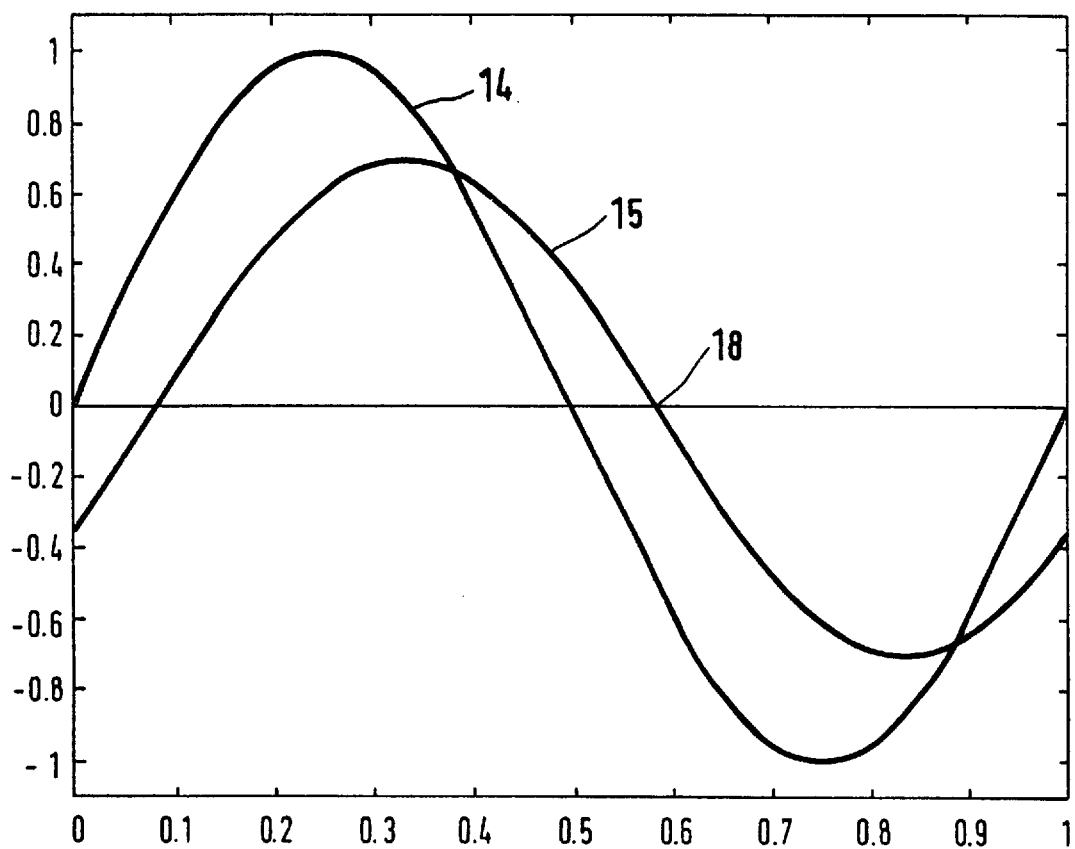
Figure 6:
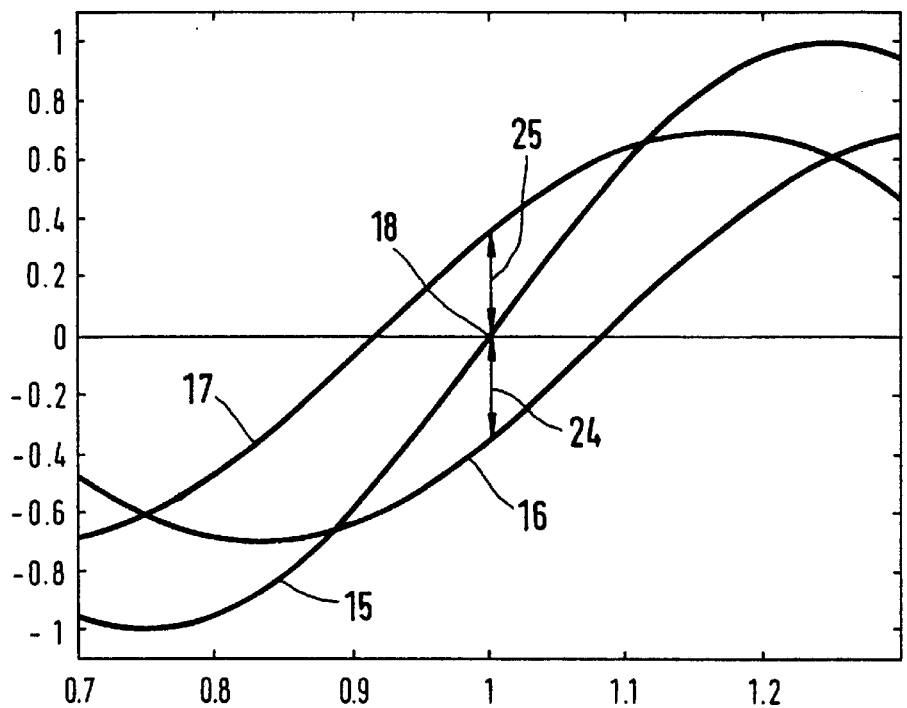
Figure 7:
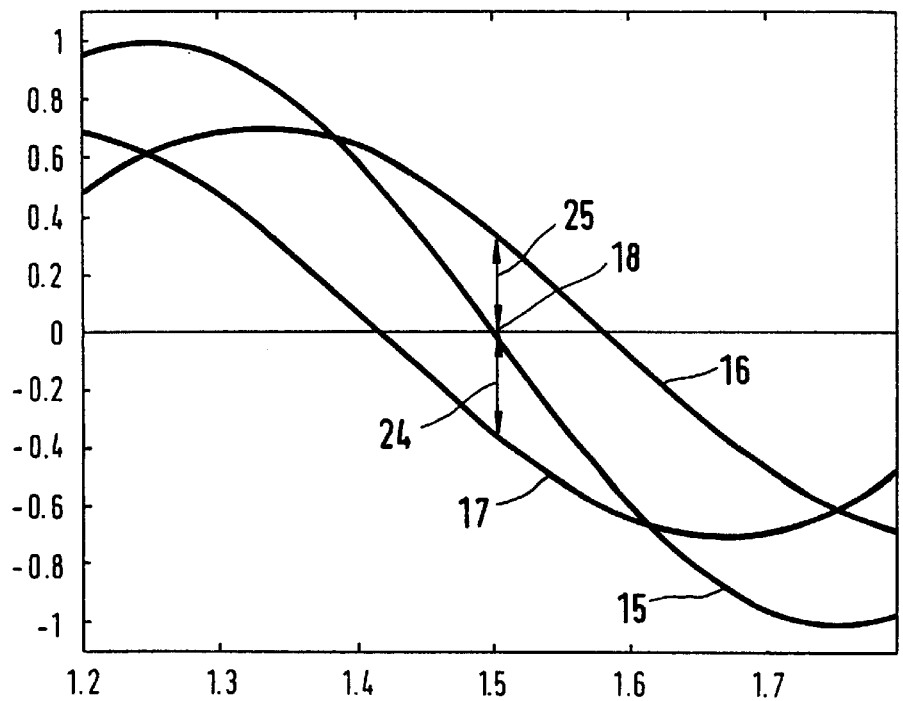
Figure 8:
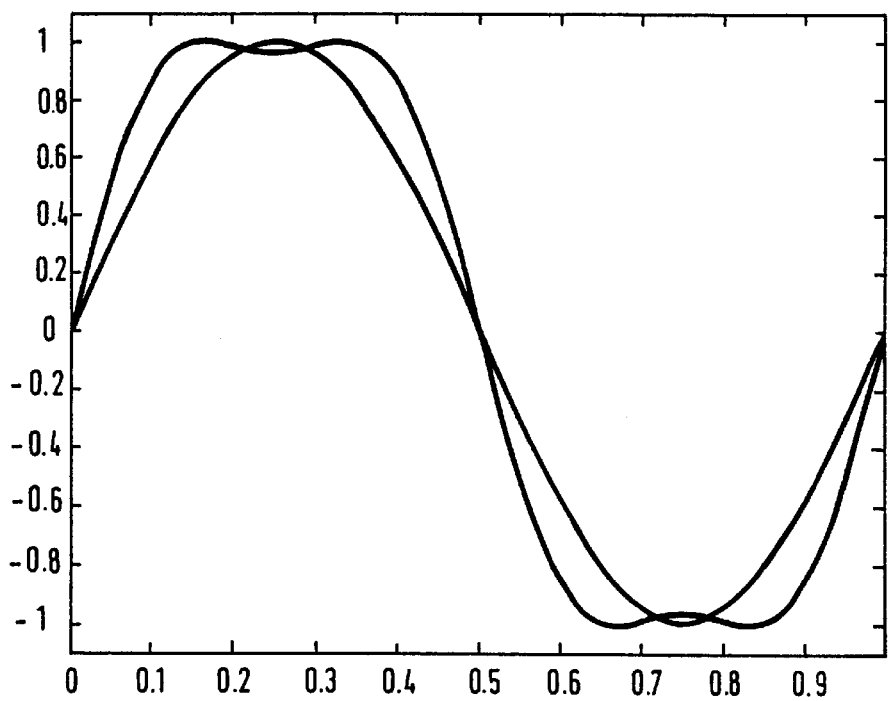
Figure 9:
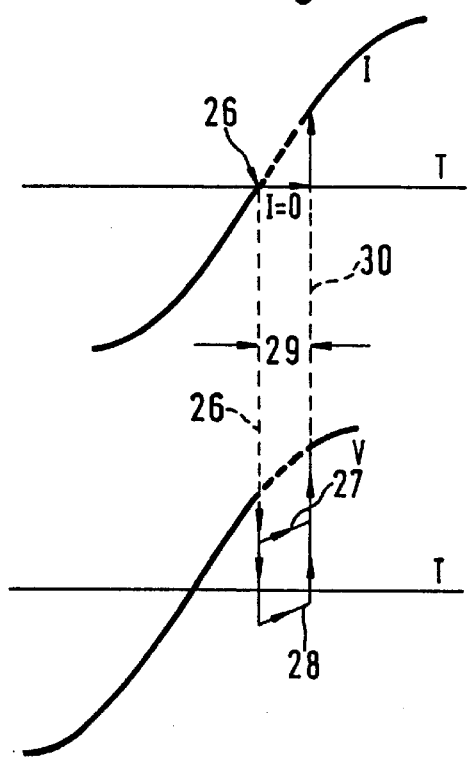

The invention is hereinafter described in more detail by way of an embodiment example. There are shown:

FIG. 1: a circuit diagram of the device according to the invention,

FIG. 2: the basic construction of a three-phase permanent magnet motor,

FIG. 3: a replacement circuit diagram of such a motor,

FIG. 4: a block diagram, which illustrates the basic principle of the voltage/frequency converter drive-control of the motor, FIG. 5: an illustrative picture which shows the voltage and current course in a phase winding of the motor, FIG. 6: an illustrative picture which shows the course with respect to time of the phase winding current and the intrinsic induction, once leading and once lagging, FIG. 7: the representation according to FIG. 6 with a falling phase winding current, FIG. 8 two examples for the voltage course at one phase of a sine-commutated motor and FIG. 9: the course of a three-phase permanent magnet motor and the voltage prevailing on the phase winding, before during and after the switching off of the supply voltage.

The basic construction of a three-phase permanent magnet motor PM, whose drive-control is by way of example explained here is to be deduced from the FIGS. 2 and 3. The motor PM comprises in the stator 4 three windings 1, 2 and 3 which in each case are allocated to a phase. The windings 1, 2, and 3 are in FIG. 2 shown in the usual manner, wherein next to the reference numerals there is a plus or minus sign, which for example characterizes the voltages prevailing at the windings 1 to 3 at a certain point in time.

Within the stator 4 a rotor 5 is rotatably mounted. This rotor comprises at least one permanent magnet 6 whose poles are arranged transversely to the rotational axis. It is to be understood that in place of the individual magnet 6 represented symbolically in FIG. 2 there may be arranged several magnets distributed in a star-shaped manner. Also the windings 1, 2, 3 (phase windings) may in each case by formed by a number of winding parts arranged in the rotor in a star-shaped manner, as this is known per se.

A replacement circuit diagram for such a motor PM is shown in FIG. 3 wherein a resistance is indicated at 3, an inductance at 8 and a generator at 9, which in phases are connected together in a star-shaped manner in this sequence. Whilst the resistance 7 and the inductance 8 represent the passive part of a motor phase winding 1, 2 or 3 the generator 9 forms the active part of these. This generator symbol emphasizes that each phase winding of the motor at the same time also forms a generator in which a voltage is induced which forms a back electromotive force (BEMF) whilst the electromotive force (EMF) is produced by the passive part of the motor.

Such a motor is usually drive-controlled by a voltage frequency converter 10, hereinafter called converter. Such converters 10 consist usually inasmuch as they are driven with alternating current or rotary current—of a rectifier, of an intermediate circuit as well as of an inverse rectifier to which there is allocated a control and regulation circuit (loop). With the representation according to FIG. 4 there is only shown the inverse rectifier, thus the power part 11 of the converter as well as the control and regulating circuit (loop) 12 with the inputs V and F impinging this, wherein V stands for voltage and F for frequency, which is to symbolize that in dependence of the signal size prevailing here the voltage or the frequency is controlled at the output of the power part 11. The power part 11 consists usually of six electronic switches 13, for example thyristors which in each case in pairs are allocated to a motor phase, wherein the upper three switches serve the production of the voltage signal with a positive polarity and the lower three the production of the voltage signal with a negative polarity. With such a converter 10 which is likewise known per se practically any signal course may be produced for drive-controlling the motor PM.

The motor PM as previously explained is driven sine-commutated, i.e. that the control and regulating circuit (loop) for each phase winding separately produces a sinusoidal voltage course corresponding to the signals prevailing at inputs V and F, wherein the voltage courses with respect to a full wave are shifted by 120° to one another. In FIG. 5 by way of example the voltage course 14 for one of the phase windings 1, 2, or 3 is shown. If this voltage 14, changing with time is applied to one of the phase windings 1, 2 or 3 of the motor, as this is effected in operation by the converter 10, then in the corresponding phase winding there sets in a current course 15 phase-shifted thereto.

In FIG. 6 there is shown part of the curve 15 representing the current course with respect to time, and specifically that part with which the current rises from its negative minimum up to zero, in order then to rise to its positive maximum. Furthermore in FIG. 6 there is shown a voltage course 16 which lags the current course 15 as well as a voltage course 17 which leads the current course 15. The voltage courses 16 and 17 are to be understood by way of example and show two constellations in which the rotor position does not correspond to the field rotation produced in the stator. The voltage course 16 and 17 is that which sets within a motor phase winding by way of intrinsic induction, and specifically in the phase winding whose current course is characterized at 15, which thus is supplied with voltage by the converter 11.

The current courses according to the curves 16 and 17 effected by intrinsic induction with an applied network supply may be measured without complicated electronic auxiliary means. In contrast they may be measured a simple manner, i.e. with the help of a voltage gauge when the corresponding phase winding at least during the measuring procedure is separated from the supply network or as long as the supply voltage is zero. This separation may with a suitable drive-control of the converter 10 be effected in a simple manner in that the two switches 13 of this phase are connected such that the corresponding phase winding is separated from the network.

Completely without load, i.e. power, may however only be switched when the phase winding current is zero. This point is characterized in the FIGS. 5 to 7 at 18. Therefore, as is to be deduced from the circuit diagram according to FIG. 1, there is provided a measuring means 20 which evaluates the zero crossing of the current course 15 of each phase of the motor PM, in order then to output a corresponding signal to a microprocessor 21 which on one side is connected to the control inputs F and V of the converter 10 and on the other side is connected via a signal lead 22 directly to the control and regulating circuit (loop) 12 of the converter 10 for switching the switch 13.

The measuring means 20 does not give the complete current course 15 in each phase winding 1, 2 or 3, but merely the zero crossing of the current course, and specifically in each of the phase windings 1, 2 and 3 and beyond whether the current course with this is rising from minus to plus or falling. The latter information may alternatively also be derived from the control and regulating circuit (loop) 12 of the converter 10.

As soon as the measuring means 20 in a phase winding 1, 2 or 3 has detected the zero crossing of the current course, via the microprocessor 21 and the signal lead 22 by way of the associated switch pair 13 the corresponding phase winding is separated from the supply network. Practically simultaneously or directly thereafter a further measuring means 23 in the form of a voltage gauge is activated which measures the voltage which then prevails in the same phase winding, and specifically at least according to the polarity. In the diagram according to FIG. 6 this for example would be a negative voltage 24 with a voltage course according to curve 16 or a positive voltage 25 with a voltage course according to curve 17. The measuring means 23 furthermore contains a comparator which ascertains whether there results a positive voltage 25, a negative voltage 24 or the voltage zero at the measuring point in time. If the voltage is zero then the zero crossing of the intrinsic induction corresponds to that of current course in the same phase winding, i.e. the motor runs optimally, the electrical rotary field and the magnetic field correspond, and no control is required. If however there results a positive or negative voltage, as is represented by way of example in FIG. 6 by way of curves 16 and 17, then the intrinsic induction respectively lags or leads the current course which may be corrected with a suitable control intervention. According to the polarity the microprocessor 21 drive-controls the frequency converter, in particular the control and regulating circuit (loop) 12. In the concrete case according to FIG. 2 and a voltage course according to curve 16 the intrinsic induction lags the current course. The induction voltage 24 evaluated in the zero crossing of the current is negative, which with a rising motor current indicates a lagging of the intrinsic induction. The microprocessor therefore drive-controls with a lower frequency and/or a higher voltage in order thus to correct this phase shifting between the current course and the intrinsic induction. Otherwise directly after the measurement has been effected the voltage is again applied to the corresponding phase winding by way of closing the associated switch pair. Since the voltage impingement to the individual phase winding is effected shifted by 120° the zero crossings of the phase windings never coincide, therefore for all phase currents the same measuring means 20 (zero crossing detector) as well as the same measuring means 23 may be applied also when in each zero crossing of each phase winding current a measurement is effected. If with the measurement there results a positive voltage 25 as is described by way of curve 17, then this means with a rising current course that the intrinsic induction leads and the drive-control frequency for the motor is to be increased or the voltage to be reduced, which is to be controlled via the microprocessor 21.

By way of FIG. 2 the reverse constellation with a falling motor current is shown. In this case the control must react exactly in reverse, in order to bring the phase winding current to correspond to the intrinsic induction in the zero crossing.

The intrinsic induction may not only be evaluated by way of the previously described voltage measurement, but also in that the phase winding current with a short-circuited motor phase winding is acquired by way of a measuring means 20. Then the measuring means 23 is not necessary. The short-circuiting of the corresponding phase winding is effected by way of the corresponding switch 13 controlled by the microprocessor 21 via the signal lead 22. With this the corresponding motor phase winding is separated from the supply network or however the measurement is carried out as long as the supply voltage of this motor phase winding is zero. Particularly then when the control only takes into account the polarity of the phase shifting and not its magnitude, does this simplified method making do with only one measuring means 20 lend itself.

In a further formation of the invention the control may be refined in that by way of the measuring means 23 not only the polarity of the phase shifting, but also its magnitude, i.e. the voltage of the intrinsic induction in the zero crossing of the associated phase winding current is evaluated and processed further so that with large deviations a larger counter control than with smaller deviations may be effected.

By way of FIG. 8 it is to be made clear that the present method may not only be carried out only with voltage impingement with purely sinusoidal signals, but also with modified signals as are shown here.

In FIG. 9 the voltage and current course before, during and after the switching off of the supply voltage prevailing at one motor phase winding for the purpose of the measurement of the intrinsic induction are represented. The point indicated in FIG. 9 at 26 characterizes the point in time at which the winding current is zero. In this moment, since no current flows, disregarding the prevailing supply voltage, one may connect free of load. The voltage is thus switched off at the point in time 26, as this is represented in the lower diagram in FIG. 9 by the arrows running down on the line 26. Also when the external supply voltage by the corresponding switching procedure is taken by the motor phase winding, then however according to the position between the rotating rotary field of the stator and the rotor circulating therein there sets in either a positive voltage 27 or a negative voltage 28 which represents the BEMF signal, i.e. which is created by intrinsic induction. Only in this time window 29, as long as the external voltage is switched off, does it need to be ascertained whether there is present an intrinsic induction 27 or an intrinsic induction 28. As soon as this is ascertained, the voltage may again be applied as this is the case at the point in time 30. Since during the whole switching off time the current flowing in this motor phase winding is zero, also with the reapplication of the supply voltage at the point in time 30 in spite of a voltage which has risen in the meantime, one may connect load-free. After this short measurement procedure the motor then runs further as previously explained.

In the above mentioned embodiment examples a commutation control has been described in which the phase position of the intrinsic induction is brought to correspond with that of the phase winding current of the same motor phase winding. Only for the sake of completeness it is pointed out that the method according to the invention may also be used for commutations in which not a corresponding (coinciding) of these variables is to be set in but a certain ratio of these variables. Furthermore it is basically also not required to measure the motor winding current and the intrinsic induction in the same phase since the phases usually are at a fixed angle to one another so that with the measurement in another phase a conversion to the same phase is possible.

LIST OF REFERENCE NUMERALS 1, 2, 3—windings or motor phase winding
4—stator
5—rotor
6—magnet
7—resistance
8—inductance
9—generator
10—converter
11—power part
12—control and regulating circuit (loop)
13—switch
14—voltage course
15—current course
16—voltage course (intrinsic induction)
17—voltage course (intrinsic induction)
18—zero crossing
20—measuring means (zero crossing detector)
21—microprocessor
22—signal lead
23—measuring means
24—negative voltage
25—positive voltage
26—point in time of the zero crossing of the current
27—intrinsic induction positive
28—intrinsic induction negative
29—measuring time
30—point in time of the reconnecting of the voltage
V—voltage control input of 10
F—frequency control input of 10
PM—motor

What is claimed is:

1. A method for controlling a voltage/frequency converter controlled single-phase or polyphase electric motor (PM) with which to the converter (10) there is supplied a variable for control which corresponds to the induced voltage (16, 17) in at least one phase winding (1, 2, 3) of the motor (PM), characterized in that the intrinsic induction (BEMF) of the at least one motor phase winding (1, 2, 3) is measured and it is evaluated whether the phase position of the intrinsic induction is in a predetermined ratio or not to that of the phase winding current (15) of a motor phase winding (1, 2, 3), and that when the phase positions are not at this predetermined ratio and that of the intrinsic induction (16, 17) leads that of the phase winding current (15) with respect to this ratio, the variable supplied to the converter is produced such that the converter increases the frequency supplied to the motor in the next control interval and/or reduces the voltage supplied to the motor in the next control interval until the phase positions of the intrinsic induction (16, 17) and of the phase winding current (15) are at the predetermined ratio, and when the phase position of the intrinsic induction (16, 17) lags that of the phase winding current (15) with respect to this ratio, the variable (V, F) supplied to the converter (10) is produced such that the converter reduces the frequency supplied to the motor in the next control interval and/or increases the voltage supplied to the motor in the next control interval, until the phase positions of the intrinsic induction (16, 17) and of the phase winding current (15) are at this predetermined ratio.

2. A method according to claim 1, characterized in that it is applied for commutating a single-phase or polyphase permanent magnet motor (PM), wherein the predetermined ratio between the phase position of the intrinsic induction (16, 17) and the phase position of the phase winding current (15) is determined preferably by the coincidence of the two phase positions.

3. A method according to claim 1, characterized in that the method is applied for the power/efficiency optimization of the motor.

4. A method according to claim 1, characterized in that the variable supplied to the converter (10) is produced such that the converter increases or reduces the frequency and/or voltage in the next control interval in dependence on the measured phase difference between the intrinsic induction (16, 17) and the phase winding current (15).

5. A method according to claim 1, characterized in that the intrinsic induction (16, 17) of each motor phase winding (1, 2, 3) is measured.

6. A method according to claim 1, characterized in that the motor phase winding (1, 2, 3), whose intrinsic induction is measured, before the beginning up to the completion of the measurement is separated from the supply network.

7. A method according to claim 1, characterized in that the motor phase winding (1, 2, 3) whose intrinsic induction is measured, is short-circuited, wherein the intrinsic induction is acquired by current measurement in this motor phase winding.

8. A method according to claim 1, characterized in that the intrinsic induction (16, 17) of a motor phase winding (1, 2, 3) is measured at least two points in time, at which the phase winding current (15) of the corresponding motor phase winding (1, 2, 3) in succession is zero.

9. A method according to claim 1, characterized in that the intrinsic induction (16, 17) per motor phase winding (1, 2, 3) is measured at two points in time at which in each case a zero crossing of the phase winding current (15) takes place.

10. A method according to claim 1, characterized in that the measuring signal indicates the respective positive or negative polarity of the phase position of the intrinsic induction (16, 17) with respect to the zero crossing (18) of the phase winding current (15), wherein under the assumption of an increasing phase winding current (15) with a positive measuring signal (25) the frequency supplied to the motor (PM) is increased in the next control interval and/or the voltage supplied to the motor is reduced in the next control interval and with a negative measuring signal (24) the frequency supplied to the motor is reduced in the next control interval and/or the voltage supplied to the motor is increased in the next control interval or vice-versa, when the phase winding current (15) falls.

11. A device for controlling a voltage/frequency converter controlled single or polyphase electric motor (PM) with a voltage/frequency converter (10) which supplies to each motor phase winding (1, 2, 3) an alternating voltage with a frequency fixed per control interval and with a control means (21) which supplies to the converter (10) a variable which corresponds to the induced voltage in at least one motor phase winding (1, 2, 3), for the frequency and/or voltage control, characterized by at least one measuring means (20) for acquiring the current flowing in a motor phase winding and an evaluation means which is connected to the control means (21) and which is set up to evaluate whether the phase position of the intrinsic induction (16, 17) is at a predetermined ratio or not to that of the phase winding current (15) of the same motor phase winding or not and which supplies a corresponding evaluation signal to the control means (12), wherein the control means, when the evaluation signal indicates to the evaluation means that the ratio of the phase position in each case of the intrinsic induction (16, 17) and of the phase winding current (15) does not correspond to the predetermined ratio, with a phase of the intrinsic induction (17) which leads with respect to this ratio, to the converter (10) supplies a control signal which effects a frequency increase and/or voltage reduction in the next control interval until the phase positions of the intrinsic induction (16, 17) and of the winding phase current (15) are at the predetermined ratio and with a phase of the intrinsic induction (16) which lags with respect to this predetermined ratio, to the converter (10) supplies a control signal which effects a frequency reduction and/or voltage increase in the next control interval until the phase positions of the intrinsic induction (16, 17) and of the phase winding current (10) are at the predetermined ratio or lie in previously fixed limits.

12. A device according to claim 11, characterized in that there are provided a first measuring means (23), connected to at least one motor phase winding, for measuring the intrinsic induction (BEMF) of at least this one motor phase winding, and a second measuring means (20), connected to at least one motor phase winding, for measuring the current flowing through this motor phase winding.

13. A device according to claim 11, characterized in that the first measuring means (23) is set up for measuring the intrinsic induction (16, 17) of each motor phase winding (1, 2, 3).

14. A device according to claim 11, characterized in that the second measuring means (20) evaluates the zero crossings (18) of the phase winding current (15) at least of one motor phase (1, 2, 3) and that the evaluation means evaluates the respective polarity of the measured phase position of the intrinsic induction (16, 17) with a zero crossing (18) of the associated phase winding current (15), wherein a positive evaluation signal (25) indicates to the first evaluation means a leading phase of the intrinsic induction (17) and a negative evaluation signal (24) a lagging phase of the intrinsic induction (16).

15. A device according to claim 11, characterized in that the control means (21), to the converter (10), supplies a correcting variable which increases, reduces or keeps constant the frequency and/or voltage applied to the motor (PM) in dependence on the acquired phase difference between the intrinsic induction (16, 17) and the phase winding current (15).

16. A device according to claim 11, characterized in that the converter (10) supplies to the motor (PM) an approximately sinusoidal three-phase voltage.

\* \* \* \* \*